United States Patent
Gohata

(10) Patent No.: US 6,966,732 B2
(45) Date of Patent: Nov. 22, 2005

(54) MOTORCYCLE TIE DOWN STRAP DEVICE

(75) Inventor: Edwin T. Gohata, Cypress, CA (US)

(73) Assignee: Ancra International, LLC., Hawthorne, CA (US)

(*) Notice: Subject to any disclaimer, the term of this patent is extended or adjusted under 35 U.S.C. 154(b) by 0 days.

(21) Appl. No.: 10/869,000

(22) Filed: Jun. 16, 2004

(65) Prior Publication Data
US 2004/0253073 A1 Dec. 16, 2004

Related U.S. Application Data

(60) Provisional application No. 60/478,607, filed on Jun. 16, 2003.

(51) Int. Cl.[7] .................................................. B60P 7/08
(52) U.S. Cl. .............................. 410/3; 410/23; 410/97; 410/100
(58) Field of Search ........................ 410/2, 3, 7, 9–11, 410/20, 22–23, 97, 100; 224/402, 403, 534, 224/324; 24/68 CD, 302, 265 CD; 248/499

(56) References Cited

U.S. PATENT DOCUMENTS

| 4,057,182 A | 11/1977 | Kolkhorst et al. | |
| 4,441,736 A | 4/1984 | Shedden | |
| 4,842,458 A * | 6/1989 | Carpenter | 410/3 |
| 5,326,202 A | 7/1994 | Stubbs | 410/3 |
| 5,529,448 A * | 6/1996 | Kosma | 410/97 |
| 6,000,591 A * | 12/1999 | Alexander | |
| 6,065,914 A | 5/2000 | Fotou | 410/3 |
| 6,171,034 B1 * | 1/2001 | Burgoon et al. | 410/3 |
| 6,286,814 B1 | 9/2001 | Heyne | |
| 6,524,041 B1 * | 2/2003 | Voiculescu | 410/100 |
| 6,655,885 B2 * | 12/2003 | Trauthwein | 410/97 |
| 6,705,811 B1 * | 3/2004 | Selby | 410/3 |
| 6,715,972 B2 * | 4/2004 | Jackson, Sr. | 410/97 |
| 6,761,519 B2 * | 7/2004 | Alderman | 410/3 |
| 6,805,522 B2 * | 10/2004 | Condon | 410/3 |

* cited by examiner

Primary Examiner—Stephen Gordon
(74) Attorney, Agent, or Firm—Edward A. Sokolski

(57) ABSTRACT

A device for removably supporting a motorcycle on a vehicle for transportation is formed by a strap assembly which is attached to a pair of risers which support the handlebars on the front wheel of the motorcycle. The strap assembly has a first strap in a bowtie configuration with a pair of closed loops which are joined together at their closed portions. The assembly further has a second strap attached at its center to the closed portions of the loops. Each portion of the linear strap adjacent to a loop is wrapped around one of the risers and then passed through the adjacent loop. The free ends of the strap are firmly attached to the floor of the vehicle to hold the motorcycle in place.

5 Claims, 4 Drawing Sheets

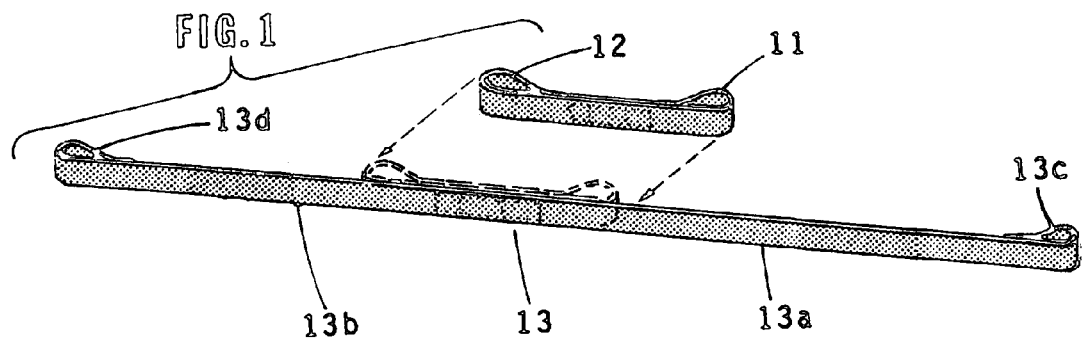
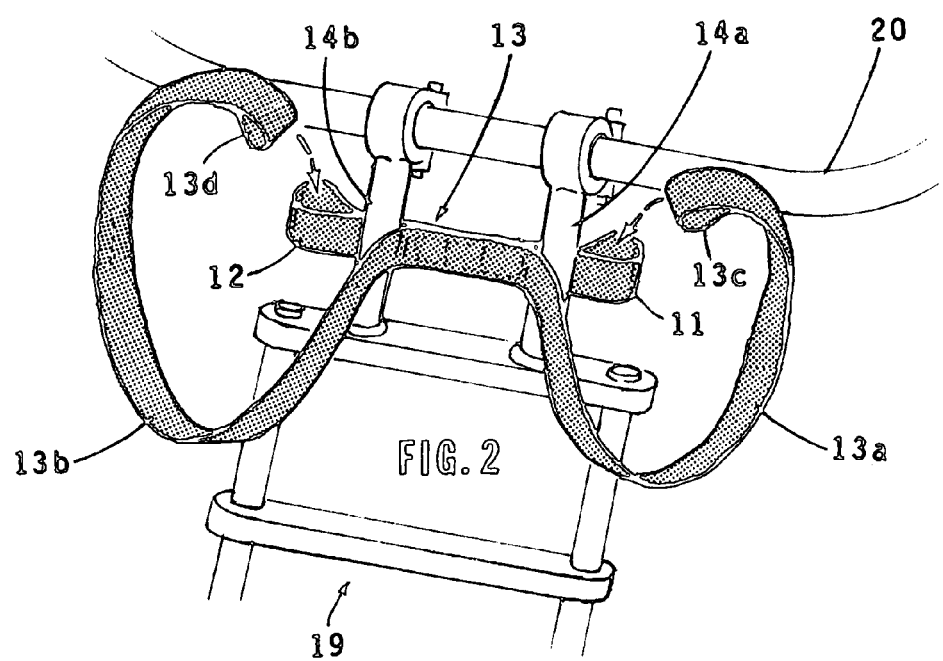

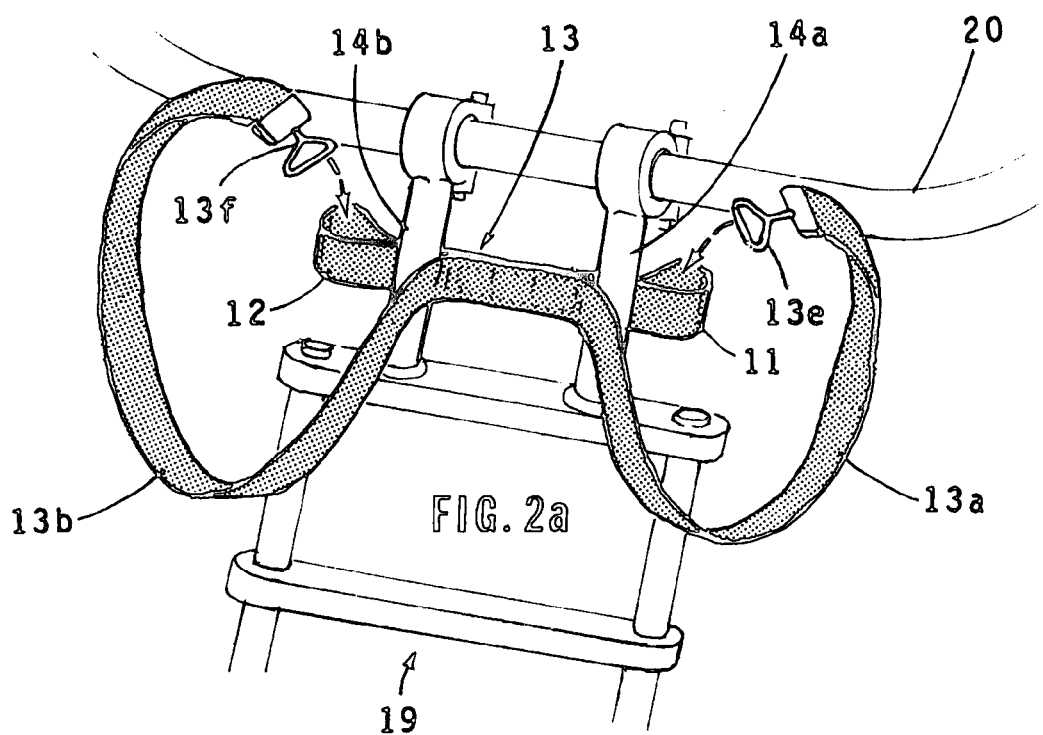

MOTORCYCLE TIE DOWN STRAP DEVICE

This application is based on Provisional Patent Application No. 60/478,607 filed Jun. 16, 2003.

BACKGROUND OF THE INVENTION

1. Field of the Invention

This invention relates to a motorcycle tie down which be used to hold a motorcycle in place on a truck or other transporting vehicle.

2. Description of the Related Art

It is important to maintain a motorcycle securely in place in an upright position on a pickup truck or trailer. If the motorcycle is not securely held in place, it can fall over should the transporting vehicle hit bumps or if there is excessive vibration. This not only could result in damage to the motorcycle but also could cause damage to the transporting vehicle or persons in the vicinity who may be sharing the road or highway.

Prior art tie down systems leave much to be desired. With the usual tie down approach, the cycle is held in place by ropes or straps attached to the handlebars. The curved shapes of most handlebars are such that traditional hooks on web straps can easily attach to them. The handlebar shapes of some custom motorcycles, however, are such that they prevent the proper attachment of traditional motorcycle tie downs. The profiles of these handlebars are either flat or curved downwardly, making it virtually impossible to properly attach tie down hook devices. In addition, many custom motorcycles have handlebars made of special alloys, are painted, or have special coatings and the traditional hook mechanism can mar the finish. A prior art approach to hold the cycle in place from the handlebars is described in U.S. Pat. No. 5,326,202 issued Jul. 5, 1994 to Stubbs. While this is an improvement over prior art handlebar connected tie downs in that it employs cuffs over the handlebars through which retaining straps fit, it has the disadvantage of not being adapted to fit every type and shape of handlebar. When using this device, the tie down is attached to loops extending from the ends of the handlebars which transfers stressful force is developed during transport on the handlebar bracket which is located at the center above the front fork assembly of the handlebars. This type of tie down places a very heavy load on the handlebars which can bend or break the handlebars themselves or their brackets.

SUMMARY OF THE INVENTION

The device of the present invention is used to removably support a motorcycle on a transporting vehicle or other support and employs a strap assembly attached to the risers of the motorcycle. The strap assembly has a "bowtie" configuration with a pair of closed loops. The closed ends of the loops are firmly attached to each other and to the central portion of a linear strap. Each portion of the linear strap adjacent to a loop of the "bowtie" portion of the strap assembly is wrapped around a separate one of the motorcycle risers which run below the motorcycle handlebars. The free ends of the linear strap are then each passed through one of the loops and are connected through a ratchet buckle to tie downs mounted on the floor of the vehicle. The risers of the motorcycle are thus firmly attached to the floor of the vehicle without there being any direct force placed on the handlebars.

DESCRIPTION OF THE DRAWINGS

FIG. 1 is an exploded perspective view of a preferred embodiment of the invention;

FIG. 2 is a perspective view of the preferred embodiment in the process of being installed on a motorcycle riser;

FIG. 2A is a perspective view showing an alterative configuration for the tie down strap of the device of the invention;

DETAILED DESCRIPTION OF THE INVENTION

Figure 3:
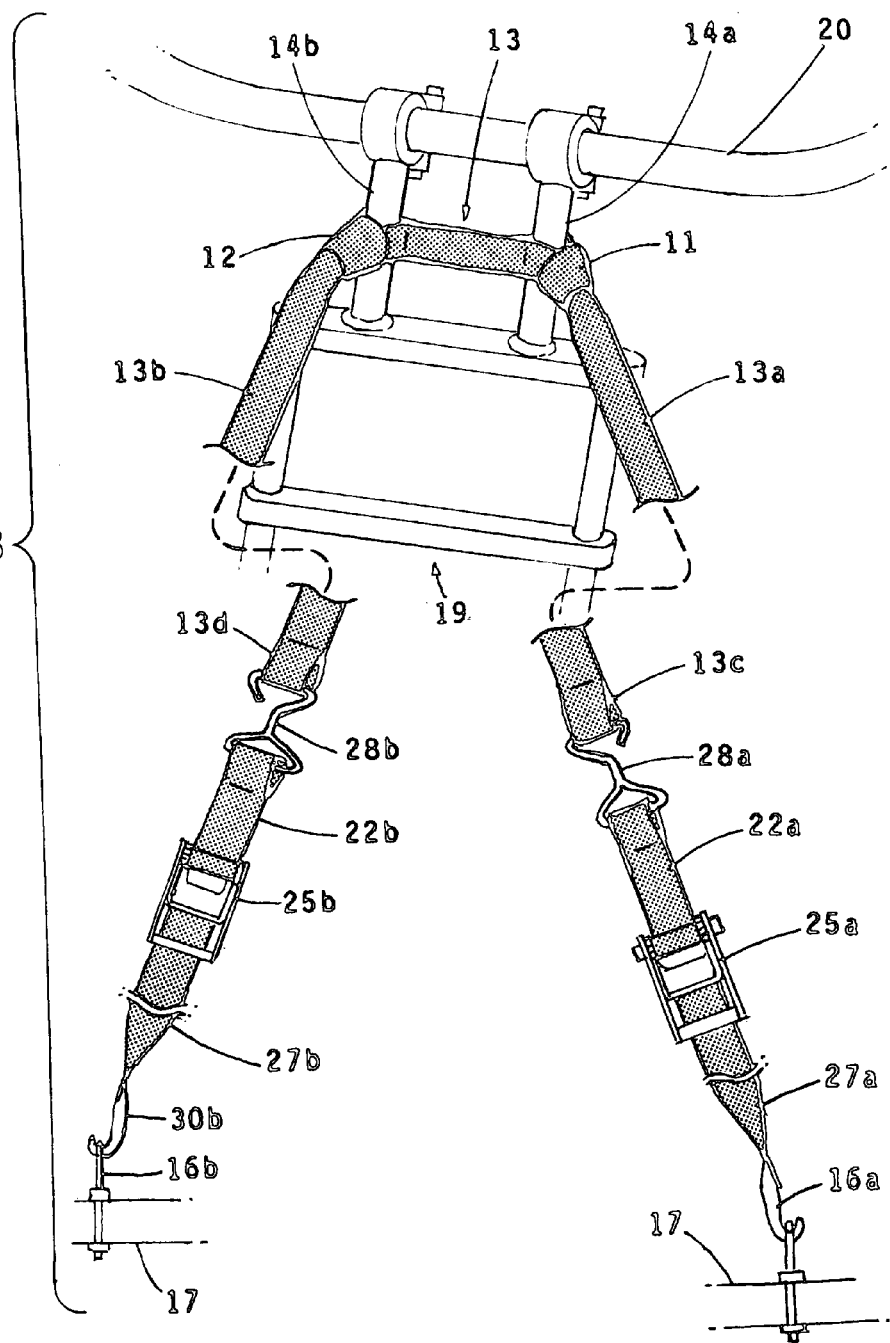
FIG. 3 is a perspective view illustrating the preferred embodiment fully installed on the risers of a motorcycle.
Figure 4:
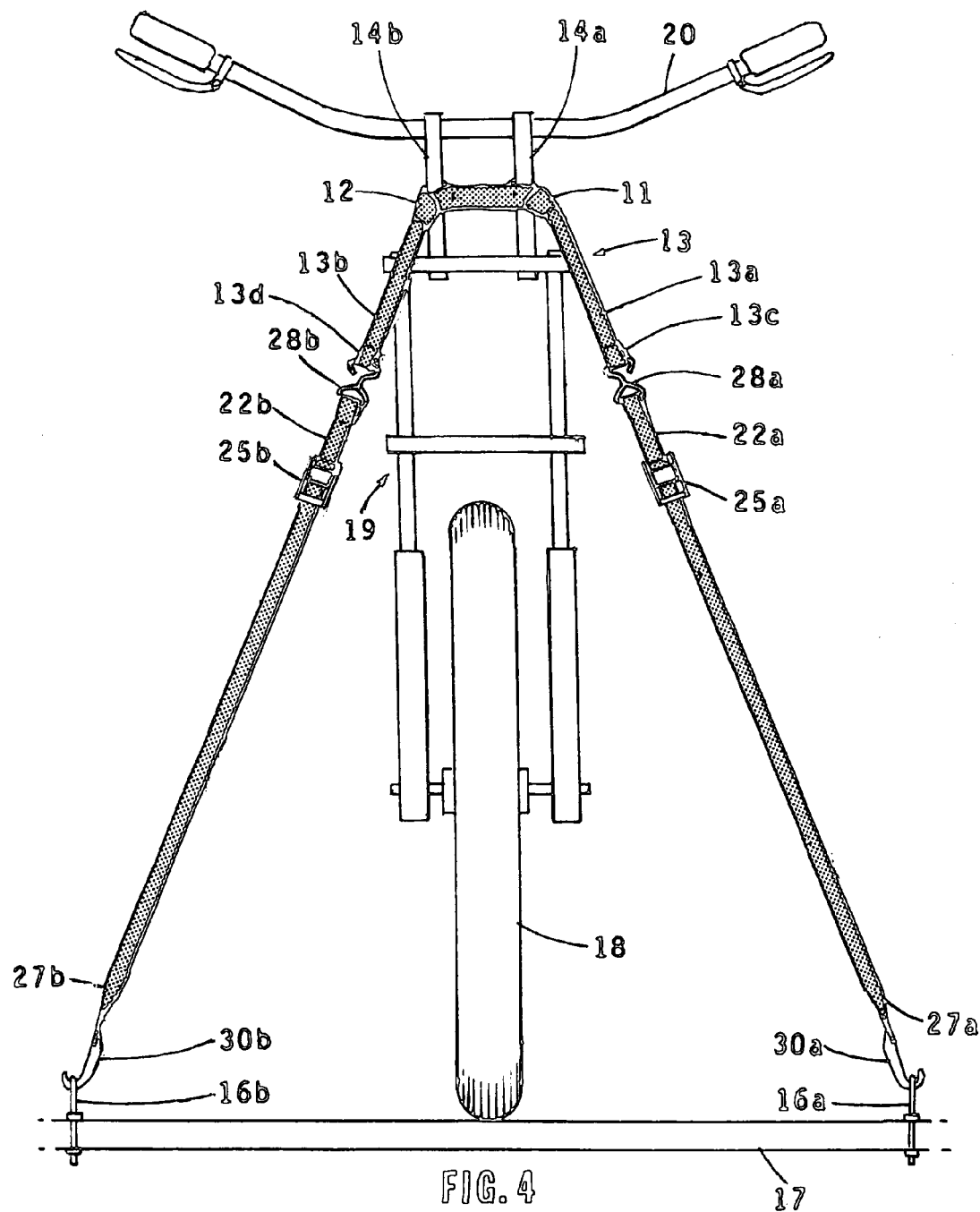
FIG. 4 is a front elevational view of the preferred embodiment installed on a motorcycle.

Referring to the Figures, the device of the invention is illustrated.

Motorcycle 19 has a pair of risers 14a and 14b which are attached to the front wheel 18 and support handle bars 20. As best shown in FIG. 1, A strap made of a high strength fabric material has a pair of loop portions 11 and 12, the closed ends of the loops being firmly attached together and to the center of linear strap 13 which has end portions 13a and 13b running in generally opposite directions from their connection points. In the preferred embodiment, loops 13c and 13d are formed on the ends of strap portions 13a and 13b.

As shown in FIG. 2, one of the loop portions 12 is placed alongside riser 14a of motorcycle 19 and then as shown in FIGS. 3–6, the strap portion 13b is wrapped around riser 14b and as shown in FIG. 3, passed through the loop portion. 12. The same procedure is then followed in attaching the other side of the strap 13a by wrapping it around riser 14a fitting it through loop portion 11. The looped ends 13c and 13d of the strap portions 13a and 13b are attached to hooks 28a and 28b. The hooks have looped portions to which straps 22a and 22b are attached. Straps 22a and 22b are respectively attached to ratchet buckles 25a and 25b. The ratchet buckles are respectively connected through straps 27a and 27b to tie downs 16a and 16b by means of hooks 30a and 30b. Tie downs 16a and 16b are attached to the floor 17 of the vehicle or other part of the vehicle on which the motorcycle is to be supported. The device of the invention can also be employed to support a motorcycle on another floor or base other than that of a vehicle. In lieu of using looped ends 13c and 13d on strap 13, as shown in FIG. 2, hooks 13e and 13f can be employed, as shown in FIG. 2A, such hooks being attached to the hooks 28a and 28b.

In this manner, a firm connection is provided with the risers which connection is tightened on the tie downs to increase the pressure on the ends of the strap. Is increased. The device employed is both simple and economical in construction and be readily installed and removed.

While the invention has been described and illustrated in detail, it is to be understood that this is by way of illustration and example only, the coverage of the application being limited by the terms of the following claims:

I claim:

1. A tie down strap system for use in supporting a motorcycle on a floor, said motorcycle having handlebars supported by a pair of risers on the front wheel of the motorcycle comprising:

a first strap portion having a pair of closed loops and closed ends attached to each other in the form of a bowtie;

a second strap portion, the central part of said second strap portion being attached to the closed ends of said first strap portion;

a first part of said second strap portion adjacent to the central part thereof being wrapped around one of said motorcycle risers and passed through one of said closed loops, a second part of said second strap adjacent to the central part thereof being wrapped around the other of said motorcycle risers and passed through the other of said closed loops, and means for attaching free ends of said second strap portion to said floor.

2. The system of claim 1 wherein said floor is a floor of a vehicle.

3. The system of claim 1 where said means for attaching free ends of said second strap portion to said floor comprises tie downs attached to said floor.

4. The system of claim 3 wherein said means for attaching free ends of said second strap portion to said floor further comprises ratchet buckles for use in tightening each of the free ends to said floor.

5. A tie down strap system for use in supporting a motorcycle on a base support comprising:

a first strap portion having a pair of loops and closed ends, said closed ends being attached to each other for form a bowtie; and a second strap portion, the central part of said second strap portion being attached to the closed ends of said of said first strap portion;

opposite ends of said second strap portion each being fitted through a separate one of the loops of said first strap portion.

* * * * *